United States Patent [19]
Grant, Jr. et al.

[11] 3,837,941
[45] Sept. 24, 1974

[54] REACTION OF BERYLLIUM ALKYL COMPOUNDS WITH MIXTURE OF $B_2H_6$ AND $B_4H_{10}$

[75] Inventors: Louis R. Grant, Jr., Los Angeles; Ross I. Wagner, Woodland Hills, both of Calif.

[73] Assignee: Rockwell International Corporation, El Segundo, Calif.

[22] Filed: June 26, 1969

[21] Appl. No.: 839,792

Related U.S. Application Data

[63] Continuation-in-part of Ser. No. 690,704, Dec. 4, 1967, abandoned.

[52] U.S. Cl. ............................. 149/22, 260/606.5 B

[51] Int. Cl. ............................................. C07f 5/02
[58] Field of Search ................. 149/22; 260/606.5 B

[56] References Cited
UNITED STATES PATENTS
3,362,860   1/1968   D'Alelio .......................... 149/22 X

*Primary Examiner*—Leland A. Sebastian
*Attorney, Agent, or Firm*—Robert M. Sperry

[57] ABSTRACT

Process for producing mobile liquid beryllium hydride compounds comprising reacting a mixture of $B_4H_{10}$ and $B_2H_6$ with beryllium alkyl compounds.

3 Claims, No Drawings

REACTION OF BERYLLIUM ALKYL COMPOUNDS WITH MIXTURE OF $B_2H_6$ AND $B_4H_{10}$

REFERENCES TO RELATED APPLICATIONS

This application is a continuation-in-part of Ser. No. 690,704, filed Dec. 4, 1967, now abandoned. This invention is also related to copending application Ser. No. 603,405, filed Dec. 16, 1966, now abandoned, in the name of C. Y. Fujikawa, having a common assignee and its continuation-in-part Ser. No. 743,261, filed July 8, 1968, now U.S. Pat. No. 3,707,564.

PRIOR ART

This invention relates to an improved method of preparing organoberyllium borohydrides which are nonvolatile liquids.

There exists a continuing need for improved liquid rocket fuels. In attempts to improve on the original ordinary hydrocarbon fuels, such as kerosene and RP-1, exotic fuels utilizing light metals, for instance, aluminum, were developed. More recently, a second generation of mobile liquid fuels utilizing lighter metals such as beryllium and boron have been developed. In abandoned application Ser. No. 603,405, now copending as a continuation-in-part, Ser. No. 743,261, filed July 8, 1968, for instance, a method for producing mobile liquid beryllium-boron fuels was described. The subject matter of Ser. No. 743,261 with respect to the making of beryllium alkyl compounds is hereby incorporated by reference.

There, $Be(CH_3)_2$ and other beryllium compounds have been liquefied with diborane, $B_2H_6$. This liquefaction, however, had the disadvantage of attaching $BH_3$ groups to the end of the polymer chain. Additionally, $BH_2R$ and $BHR_2$ groups, where R is an alkyl group, were attached. These terminating groups are undesirable as they are thermally unstable. Further, these alkyl groups necessarily result in lower specific impulse. The previously referred to copending application claims the unexpected advantage of liquefaction of certain beryllium compounds using $B_4H_{10}$. This liquefaction results in termination by $B_3H_7$ groups which are not readily thermally degraded and do not readily alkylate. This method had the disadvantage of a relatively long reaction time and a somewhat inefficient yield. For any rocket fuel to become practicable as an actual propellant, it would be desirable to achieve all possible economies in its production.

Wiberg, in AEC-tr-1931, April 8, 1964, pages 16 and 29, and Schlesinger and Burg, *Journal of the American Chemical Society*, 62, 3425 (1940), teach the reaction of boron hydride ($B_2H_6$) with dimethyl beryllium. The reaction of Be $(CH_3)_2$ and $BH_3$ or $B_2H_6$ is specific and does not give polymers resultant from the practice of the herein disclosed process. Be $(BH_4)_2$, the normal product of the $B_2H_6/Be(CH_3)_2$ reaction at elevated temperatures, is a volatile solid. Likewise, if the same reaction is carried out at ambient temperature, the product is $(CH_3BeBH_4)_2$, also a volatile solid, unlike the nonvolatile liquids resultant from the practice of the herein disclosed invention.

It is an object of this invention to provide an improved process for the synthesis of mobile liquid beryllium-boron compounds.

It is a further object of this invention to provide an improved process for the synthesis of mobile liquid beryllium-boron fuels.

Other and more specific advantages of this invention will become apparent from the following description:

The objects of this invention are accomplished by: in the process of producing a high energy mobile liquid beryllium hydride compound comprising reacting $B_4H_{10}$ and a compound selected from the group consisting of $X_1BeX_2$ and

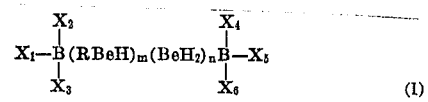

(1)

wherein R is selected from the group of alkyl radicals containing from one to about six carbon atoms; $X_1$ through $X_6$ are individually selected from the group consisting of H and R; such that in the compound $X_1BeX_2$ only one of the X's can be H; further such that for any particular R each of $X_1$ through $X_6$ is selected from the group consisting of H and that particular R; $m$ is from one to ten; and $n$ is from zero to about six; and recovering said high energy mobile liquid beryllium hydride compound, the improvement consisting of mixing from 50 to 7.7 mole percent $B_2H_6$ with the $B_4H_{10}$. It has been unexpectedly found that if the described liquefaction process is conducted with diborane added to the mixture, a significant reduction in the reaction time, as well as inhibition of the thermal degradation of $B_4H_{10}$, occurs. In addition, the final liquid product has a higher degree of polymerization than when prepared in the absence of the diborane additive.

The purpose of using a mixture of $B_2H_6$ and $B_4H_{10}$ is that the $B_2H_6$ tends to catalyze the reaction such that the $B_4H_{10}$ can react with the beryllium alkyls, such as $Be(CH_3)_2$, before this unstable boron hydride ($B_4H_{10}$) has decomposed appreciably. An example of the $B_2H_6$ acting as a catalyst for this reaction is as follows:

When $B_4H_{10}$ vapor (8.94 mmoles) was allowed to react with solid $Be(CH_3)_2$ (9.15 mmoles), total liquefaction of the $Be(CH_3)_2$ occurred in 26 hours. The nonvolatile liquid product analyzed as $[(CH_3)_3B_3H_4]_2 (BeH_2)_2(CH_3BeH)_2$.

When a mixture of $B_2H_6$ (1.06 mmoles) and $B_4H_{10}$ (4.27 mmoles) was added to $Be(CH_3)_2$ (4.03 mmoles) at ambient temperature, the $Be(CH_3)_2$ formed a liquid polymer within 7.5 hours. The nonvolatile liquid product analyzed as a 39:61 mixture of $B_3H_7(CH_3BeH)_2Be(CH_3)_2BH_3$ and $B_3H_7(CH_3BeH)_4 BH_2CH_3$.

The use of a mixture of diborane and tetraborane having a mole ratio of diborane to tetraborane of from 1:1 to 1:12 results in a rapid liquefaction of the beryllium compound, and yet the final product retains a significant amount of $B_3H_7$ termination groups. If diborane to tetraborane ratios above 1:1 are used, the reaction approaches that of pure diborane and has the disadvantages of $BH_3$ termination previously described. If the diborane to tetraborane ratio is much below 1:12, the reaction approaches that of pure tetraborane and has the disadvantages of slow reaction time and thermal degradation of tetraborane previously described. The preferred ratio of diborane to tetraborane is between 1:3 and 1:5, or, in other terms, of from 25 to 16⅔ mole percent diborane in the diborane-tetraborane mixture.

The reaction takes place at ambient temperatures. It ordinarily takes place at the autogenetic pressure of the $B_4H_{10}/B_2H_6$ liquid mixture. This can be from below atmospheric pressure to slightly above. Temperatures above about 30°C cause inordinate decomposition of the $B_4H_{10}$. At temperatures below about 0°C, the reaction proceeds too slowly to be of interest. The reaction commences immediately, but complete conversion can take several hours.

The organo-beryllium borohydride hydride employed herein and having the formula

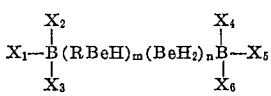

is easily prepared according to one of the following reactions: (a) in the case wherein R is methyl such as $(MeBeBH_4)_2$ is mixed with a commercially available dialkyl beryllium, such as dimethyl beryllium, of the general formula RBeR and with beryllium hydride of the formula $BeH_2$ in a hydrocarbon solvent and stirred for several days at room temperature under normal atmospheric conditions. The $BeH_2$ can be prepared by the reaction of beryllium borohydride, $Be(BH_4)_2$, with an alkyl aluminum compound, $AlRR'R''$, wherein R, R' and R'' are selected from a class consisting of H and alkyl radicals of one to eight C atoms and wherein at least one of the R's is an alkyl group. The reaction of the two compounds is generally carried out in the presence of a conventional hydrocarbon solvent at from about 0° to 100°C. Particularly good yields have been obtained at reaction temperatures of 60° to 65°C. When the reactants are present in equal molar quantities the reaction proceeds according to the following equation:

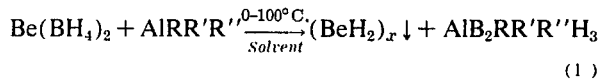

(1)

The by-product compound remaining dissolved in the solvent has not been separated for characterization but is predicted to be $AlB_2RR'R''H_3$. The $(BeH_2)_x$ formed is a solid. The alkyl aluminum compounds include, for example, methyl aluminum dihydride, butyl aluminum dihydride, dipropyl aluminum hydride, trioctyl aluminum and the like. At the completion of the reaction period the unreacted solid material is removed by filtration and the solvent evaporated to leave behind a solid of the general formula:

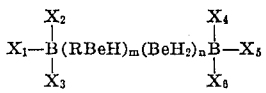

The reactant $(MeBeBH_4)_2$ is easily prepared by the reaction of equal molar quantities of $Be(BH_4)_2$ and $(Me)_2Be$. The reaction to form the organoberyllium borohydride is as follows: $(Me)_2Be + Be(BH_4)_2 \rightarrow (MeBeBH_4)_2$. The next reaction as set forth supra or (b) is wherein R is two to six, that is straight or branched chain lower alkyl groups such as ethyl, propyl, isopropyl, isobutyl, hexyl and the like, then varying amounts of $BeR_2$ are intimately mixed with $Be(BH_4)_2$ under normal atmospheric conditions and at room temperature to give the corresponding

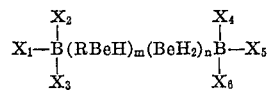

The compound

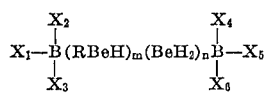

can also be prepared by (c) reacting $Be(BH_4)_2$ with $BeR_2$ wherein R is a lower alkyl of two to six carbon atoms as defined immediately above and with $BeH_2$. The intimate mixing of $Be(BH_4)_2$, $BeR_2$ and $BeH_2$ is carried out under conditions as set forth immediately above.

Other specific examples of how the starting materials of this type can be prepared are as follows:

(a) $(CH_3)_2Be + B_2H_6$ at 90°C gave $CH_3BH_2(CH_3BeH-)_2BeH_2Be(CH_3)_2 \cdot BH_3$, a nonvolatile liquid without formation of noncondensible gases.

(b) $(CH_3)_2Be + (BeH_2)_n \cdot (BH_3)_2 \rightarrow (BH_3)(CH_3BeH)_2(BeH_2)_{n-1}(BH_3)$ (c) $(C_2H_5)_2Be + (BeH_2)_n \cdot [BH_3]_2 \rightarrow BH_3(C_2H_5BeH)_2 \cdot (BeH_2)_{n-1}BH_3$ (d) $(C_2H_5)_2Be + (BeH_2)_n[B(C_2H_5)_3-]_2 \rightarrow B(C_2H_5)_3(C_2H_5BeH)_2(BeH_2)_{n-1}B(C_2H_5)_3$ Comparisons were made of various beryllium alkyl compounds upon reaction with tetraborane alone and upon reaction with tetraborane/diborane mixture. Examples II, IV, V, and VII show the advantages of the mixture of the instant invention. Results are given below:

EXAMPLE I

To a heavy-wall cylindrical reactor containing $Be(CH_3)_2$ (0.3535 gram, 9.05 mmoles) was added liquid $B_4H_{10}$ (0.4794 gram, 8.00 mmoles). During the second experiment, $Be(CH_3)_2$ (0.3577 gram, 9.15 mmoles) was added to one arm of a heavy-wall inverted Y-reactor and liquid $B_4H_{10}$ (0.4764 gram, 8.94 mmoles) condensed in the second arm of the reactor (vapor-phase reaction).

Total liquefaction of the $Be(CH_3)_2$ in the vapor-phase reaction occurred in 26 hours. The liquid-phase reaction after this same time yielded primarily solids suspended in the unreacted $B_4H_{10}$ and alkylboron products.

Analysis of a sample (0.0268 gram) of the liquid obtained from the vapor-phase reaction yielded $H_2$ (2.67 mmoles), B (0.0108 gram, 1.0 matom), Be (0.0058 gram, 0.64 matom), and $CH_4$ (0.35 mmole).

EXAMPLE II

The $Be(CH_3)_2$ of Example I was reacted with a 4:1 $B_4H_{10}:B_2H_6$ mixture using a $Be(CH_3)_2:B_4H_{10}$ ratio of about 1:1. In 8 hours the reaction was complete yielding $H_2$ (0.12 mmole), $B_2H_6$ (0.14 mmole), unreacted $B_4H_{10}$ (3.06 mmole), $B(CH_3)_3$ (0.70 mmole), $(CH_3BeBH_4)_2$ (0.40 mmole) and .1191 gram of liquid.

EXAMPLE III

Be(C$_2$H$_5$)$_2$ (0.841 gram, 12.5 mmole) was treated with B$_4$H$_{10}$ (6.9 mmole) at ambient temperature. After 18 hours, a solid-liquid mixture had formed in the reactor. Approximately 24 hours after initiation of the reaction, the mixture reverted to a clear liquid. The reactor was opened and hydrogen (2.03 mmole) was removed. The volatile products were then removed and identified as being primarily [(C$_2$H$_5$)$_2$BH]$_2$ (0.305 gram; vapor pressure, 3 mm Hg at 0°C). The nonvolatile material consisted of a very thick liquid which was extracted with n-hexane. This treatment resulted in the separation of the viscous material into an insoluble solid an n-hexane soluble product. Concentration of the n-hexane afforded the isolation of the liquid product B$_3$H$_7$(C$_2$H$_5$BeH)BeH$_2$BH$_3$.

Analyses for B$_3$H$_7$(C$_2$H$_5$BeH)BeH$_2$BH$_3$ (0.0350-gram sample) were as follows: Calculated (in mmoles) were: Be, 0.68; B, 1.35; hydridic hydrogen, 4.73; and hydrolyzable C$_2$H$_5$ groups, 0.34. Found were: Be, 0.63; B, 1.38; hydridic hydrogen, 4.42; and hydrolyzable C$_2$H$_5$ groups, 0.30.

EXAMPLE IV

Using a B$_4$H$_{10}$:B$_2$H$_6$ ratio of 2.98:0.69 and a Be(C$_2$H$_5$)$_2$:B$_4$H$_{10}$ ratio of about 1:1, a liquid product was isolated after 7 hours. Analysis of the liquid yielded: Be, 18.1 percent; B, 22.4 percent; hydrolyzable C$_2$H$_5$ groups, 0.0105 mmole/mg; and hydridic hydrogen, 0.0811 mmole/mg. Calculated for a 75:25 mixture of B$_3$H$_7$(C$_2$H$_5$BeH)$_2$(BeH$_2$)$_2$BH$_2$C$_2$H$_5$ and B$_3$H$_7$(C$_2$H$_5$BeH)$_2$BeH$_2$BH(C$_2$H$_5$)$_2$ are: Be, 18.2 percent; B, 23.3 percent; hydrolyzable C$_2$H$_5$ groups, 0.0108 mmole/mg; and hydridic hydrogen, 0.0820 mmole/mg.

EXAMPLE V

Using a B$_4$H$_{10}$:B$_2$H$_6$ ratio of 8.18:0.68 and a Be(C$_2$H$_5$)$_2$:B$_4$H$_{10}$ ratio of 2.76:8.18, reaction was essentially complete in 3-1/2 hours. A 0.0218 gram sample of the liquid product contained Be, 18.6 percent; B, 20.0 percent; hydrolyzable C$_2$H$_5$ groups, 0.0470 mmole/mg; and hydridic hydrogen, 0.0787 mmole/mg. Calculated for an 80:20 mixture of C$_2$H$_5$B$_3$H$_6$(BeH$_2$)$_4$(C$_2$H$_5$BeH)BH(C$_2$H$_5$)$_2$ and B$_3$H$_7$(BeH$_2$)$_3$(C$_2$H$_5$BeH)BH(C$_2$H$_5$)$_2$ are: Be, 20.3 percent; B, 20.3 percent; hydrolyzable C$_2$H$_5$ groups, 0.0487 mmole/mg; and hydridic hydrogen, 0.0789 mmole/mg.

EXAMPLE VI

The solid copolymer [(C$_2$H$_5$)$_2$Be·C$_2$H$_5$BeH]$_x$ (0.7369 gram, 7.50 matoms of Be) was treated with B$_4$H$_{10}$ (4.82 mmoles) for 94 hours. The volatile products were H$_2$ (1.43 mmoles) and B(C$_2$H$_5$)$_3$ (2.31 mmoles); B$_4$H$_{10}$ (0.53 mmoles) was also recovered. The nonvolatile liquid product was treated with an additional quantity of B$_4$H$_{10}$ (1.54 mmoles) for 23 hours, after which time H$_2$ (0.23 mmoles), B$_4$H$_{10}$ (0.70 mmoles) and B(C$_2$H$_5$)$_3$ (0.32 mmoles) were recovered. The nonvolatile liquid product, containing a small amount of suspended solid, was extracted with n-hexane, filtered, and the n-hexane filtrate concentrated. The amount of liquid recovered was 0.5338 gram.

Analysis of a sample (0.0352 gram) of the liquid yielded H$_2$ (2.85 mmoles), B (0.0085 gram, 0.79 matom), Be (0.0061 gram, 0.68 matom), and hydrolyzable C$_2$H$_5$ groups, as ethane, (0.54 mmole). This results in Be:B:H:C$_2$H$_5$ ratios of 5.0:5.8:21.0.0:4.0; calculated for (B$_3$H$_7$)$_2$(C$_2$H$_5$BeH)$_4$ BeH$_2$ are: 5:6:22:4.

EXAMPLE VII

Treatment of a [(C$_2$H$_5$)$_2$Be·C$_2$H$_5$BeH]$_x$ sample (0.6707 gram, 12.2 matoms of Be) with a mixture of B$_4$H$_{10}$ (5.31 mmoles) and B$_2$H$_6$ (1.45 mmoles) resulted in liquefaction of the copolymer in less than 48 hours. The volatile products were H$_2$ (1.42 mmoles) and B(C$_2$H$_5$)$_3$ (3.08 mmoles); B$_4$H$_{10}$ (1.07 mmoles) was also recovered. The liquid product when extracted with n-hexane precipitated a quantity of solid. The filtrate after concentration yielded a clear mobile liquid weighing 0.1253 gram.

Analysis of a sample (0.0214 gram) of the liquid yielded H$_2$ (1.95 mmoles), B (0.0064 gram, 0.59 matom), Be (0.0034 gram, 0.38 matom), and hydrolyzable C$_2$H$_5$ groups, as ethane, (0.29 mmole). This results in Be:B:H:C$_2$H$_5$ ratios of 3.93:6.09::20.2:3.00; calculated for (B$_3$H$_7$)$_2$(C$_2$H$_5$BeH)$_3$ are 3:6:21:3.

EXAMPLE VIII

A glass vessel containing a clear viscous liquid with an average empirical formula of CH$_3$H$_2$B(CH$_3$BeH)$_8$BeH$_2$BH$_3$ was stirred with a mixture of 50 mole percent B$_2$H$_6$ and 50 mole percent B$_4$H$_{10}$ at ambient temperature and pressure. A very mobile nonvolatile liquid was obtained.

EXAMPLE IX

Another clear viscous liquid with an average empirical formula of (CH$_3$)$_2$BH(CH$_3$BeH)$_2$BH(CH$_3$)$_2$ was treated with 15 mole percent B$_2$H$_6$ and 85 mole percent B$_4$H$_{10}$ as above. Again a very mobile, nonvolatile liquid was obtained.

EXAMPLE X

A glass vessel containing a clear viscous liquid with an average empirical formula of CH$_3$H$_2$B(CH$_3$BeH)$_8$BH$_3$ was stirred with 66 mole percent B$_4$H$_{10}$ and 33 mole percent B$_2$H$_6$ at ambient temperature and pressure. A very mobile nonvolatile liquid was obtained.

Since it is obvious that many changes and modifications can be made in the above described details without departing from the nature and spirit of the invention, it is to be understood that the invention is not to be limited thereto except as set forth in the appended claims.

We claim:

1. In the process of producing a high energy mobile liquid beryllium hydride compound comprising reacting B$_4$H$_{10}$ and a compound selected from the group consisting of X$_1$BeX$_2$ and $$X_1-B(RBeH)_m(BeH_2)_n\overset{X_2}{\underset{X_3}{|}}\overset{X_4}{\underset{X_6}{|}}B-X_5$$

wherein R is selected from the group of alkyl radicals containing from one to about six carbon atoms; X$_1$ through X$_6$ are individually selected from the group consisting of H and R; such that in the compound X$_1$BeX$_2$ only one of the X's can be H; further such that for any particular R each of X$_1$ through X$_6$ is selected from the group consisting of H and that particular R;

$m$ is from one to ten; and $n$ is from zero to about six; and recovering said high energy mobile liquid beryllium hydride compound, the improvement consisting of mixing from 50 to 7.7 mole percent $B_2H_6$ with the $B_4H_{10}$.

2. The process of claim 1 in which from 25 to 50 mole percent diborane is present in the diborane/tetraborane mixture.

3. The process of claim 1 wherein the $B_4H_{10}/B_2H_6$ mixture is reacted with a compound selected from the group consisting of $Be(CH_3)_2$ and $Be(C_2H_5)_2$.

* * * * *